United States Patent [19]

Sakaguchi

[11] Patent Number: 5,680,527
[45] Date of Patent: Oct. 21, 1997

[54] INFORMATION PROCESSING SYSTEM HAVING RECOGNIZED PATTERN CONTROL

[75] Inventor: Katsuhiko Sakaguchi, Tokyo, Japan

[73] Assignee: Canon Kabushiki Kaisha, Tokyo, Japan

[21] Appl. No.: 317,027

[22] Filed: Oct. 3, 1994

Related U.S. Application Data

[63] Continuation of Ser. No. 159,105, Nov. 30, 1993, abandoned, which is a continuation of Ser. No. 902,469, Jun. 19, 1992, abandoned, which is a continuation of Ser. No. 582,790, Sep. 17, 1990, abandoned, which is a continuation of Ser. No. 194,130, May 16, 1988, abandoned.

[30] Foreign Application Priority Data

May 22, 1987 [JP] Japan ................................ 62-123974

[51] Int. Cl.$^6$ .................................................... G06T 7/00
[52] U.S. Cl. ........................ 395/135; 395/358; 382/189
[58] Field of Search ..................... 364/518, 521; 340/706–710, 723; 395/134, 137, 138, 139, 155, 358, 133; 382/1, 8, 10, 11, 13, 21, 25, 48, 57, 59, 69, 181, 186, 187, 188, 189

[56] References Cited

U.S. PATENT DOCUMENTS

| | | | |
|---|---|---|---|
| 3,976,982 | 8/1976 | Eiselen | 395/138 X |
| 4,672,677 | 6/1987 | Yamakawa | 382/59 X |
| 4,672,683 | 6/1987 | Matsueda | 340/707 X |
| 4,783,829 | 11/1988 | Miyakawa et al. | 382/25 X |

OTHER PUBLICATIONS

Lamb et al., "New Techniques for Gesture–based Dialog", INTERACT '84, First IFIP Conference on 'Human–Computer Interaction' Sep. 4, 1984.

Inside MacIntosh, vol. 1, 1985, pp. I–135 through I–197.
Microsoft Paintbrush User's Guide, 1986, pp. 25–33 and 58–59.
Tang GY, "A Management System for an Integrated Database of Pictures and Alphanumerical Data", Computer Graphics and Image Processing, vol. 16, 1981, pp. 270–286.
Grosky WI, "Toward a Data Model for Integrated Pictorial Databases," Computer Vision, Graphics, and Image Processing, vol. 25, 1984, pp. 371–382.
Tamura H. and Yokoya N, "Image Database Systems: A Survey," Pattern Recognition, vol. 17, No. 1, pp. 29–43, 1984.
Chang N. and Fu K., "Query–by–Pictorial–Example," IEEE Transactions on Software Engineering, vol. SE 6, No. 6, pp. 519–524, 1980.

Primary Examiner—Mark K. Zimmerman
Attorney, Agent, or Firm—Fitzpatrick, Cella, Harper & Scinto

[57] ABSTRACT

An information processing system has a memory to store information, a display device such as an LCD to display the information, as an image, stored in the memory, and a pattern input device such as a transparent tablet having a position coordinates system corresponding to the display screen of the display device, for inputting a figure pattern to designate the image displayed on the display screen. A recognizing circuit recognizes a shape of the figure pattern input from position coordinates of the figure pattern input by the pattern input means, and a CPU fetches the image, as information, displayed in an area on the display screen of the display device corresponding to the area enclosed in the figure pattern whose shape is recognized by the recognizing circuit, and for performing information processes. An an image data memory stores the information fetched by the CPU. With this system, the information on the display screen designated by the pointing device can be stored into an arbitrary memory. A range of the information, a memory to store the information, and a storage form can be easily designated.

37 Claims, 3 Drawing Sheets

INFORMATION PROCESSING SYSTEM HAVING RECOGNIZED PATTERN CONTROL

This application is a continuation of application Ser. No. 08/159,105 filed Nov. 30, 1993, now abandoned, which is a continuation of application Ser. No. 07/902,469, filed Jun. 19, 1992, abandoned, which is a continuation of application Ser. No. 07/582,790, filed Sep. 17, 1990, abandoned, which is a continuation of application Ser. No. 07/194,130, filed May 16, 1988, abandoned.

BACKGROUND OF THE INVENTION

1. Field of the Invention

The present invention relates to an information processing system adapted to store into a memory the information whose range is designated in information displayed on the display screen of a display device.

2. Related Background Art

In general, there is known a system in which a range (position) of information such as image data or character data displayed on the display screen of a display device is designated or the information whose range is designated is erased from the display screen or synthesized on the display screen. Hitherto, a pointing device such as cursor key or mouse has been used as input means for designating a range of the information in such an information processing system.

However, in such a conventional information processing system, although the information whose range is designated by the pointing device can be automatically stored into a predetermined memory, it cannot be stored into an arbitrary one of a plurality of memories. Therefore, when printing or correcting the information on the screen, the information must be stored into the memory every time, causing a problem such that the input operations by the operator become complicated.

SUMMARY OF THE INVENTION

It is the first object of the invention to solve such problems and to provide an information processing system which can store the information on the display screen which is designated by a pointing device into an arbitrary memory device.

The second object of the invention is to provide an information processing system in which not only the position and range of the information displayed on the display screen by inputting a figure can be designated, but also a memory in which to store the information indicated in accordance with the input figure can be designated, and a storage form of the information indicating whether data is stored as a code, dots, or the like can be designated.

The third object of the invention is to provide an information processing system in which a range of information displayed on the display screen of a display device is designated by a figure pattern which is input from a tablet device and, the information whose range is designated is stored from a first memory into an area in a second memory which is decided in accordance with the shape of the figure pattern, thereby enabling various images to be synthesized.

DETAILED DESCRIPTION OF THE EMBODIMENTS

The present invention will be described in detail herein below with respect to an embodiment.

Figure 1:
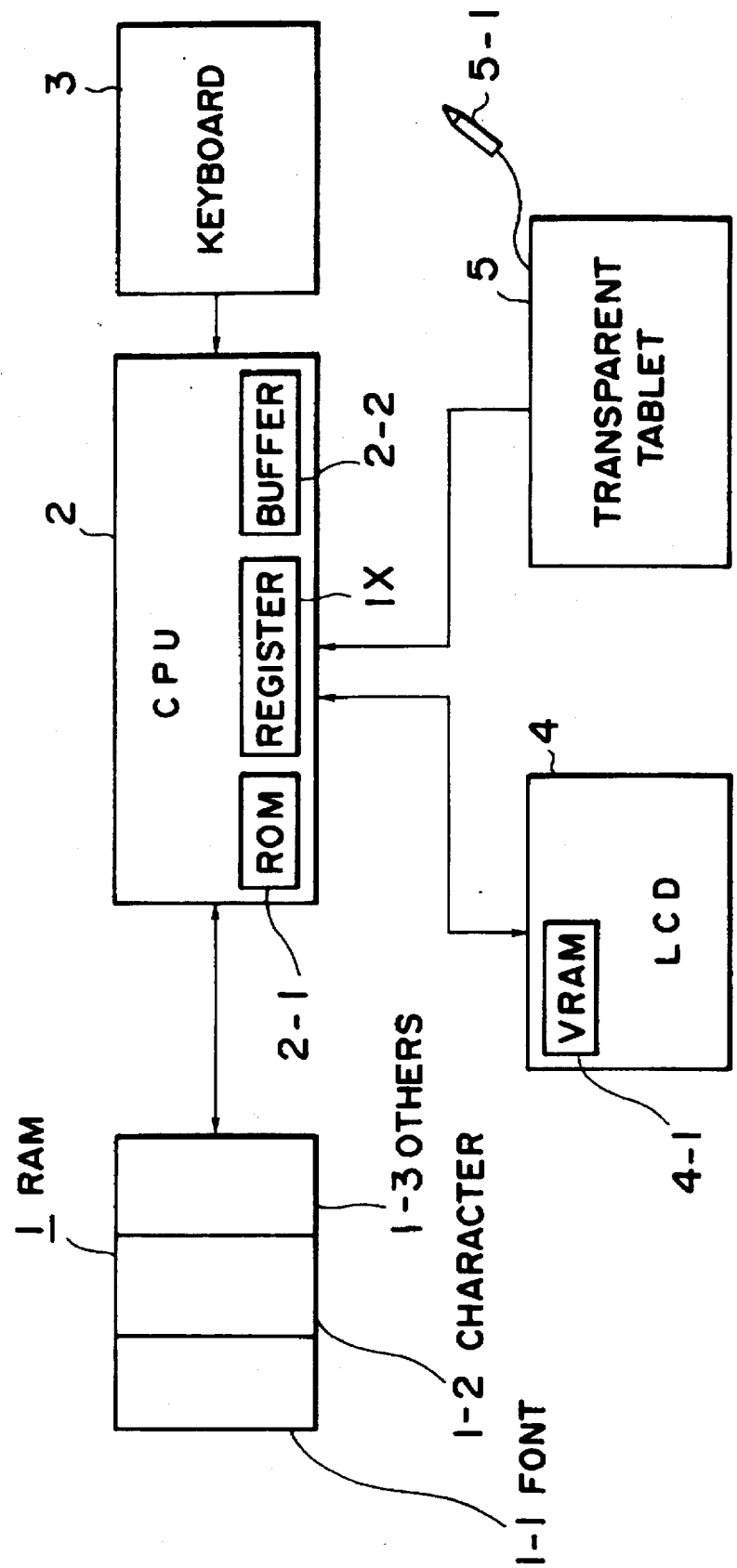
FIG. 1 is a block diagram showing an example of a practical arrangement of an information processing system according to an embodiment of the present invention.

FIG. 1 shows a practical arrangement of an information processing system.

In FIG. 1, reference numeral 1 denotes a random access memory (RAM) used as second memory means to store information.

The RAM 1 has a font information area 1-1 to store font information which expresses character data in dot form, a code information area 1-2 in which the character data is expressed in numerical value form, and an area 1-3 to store other information.

Reference numeral 2 denotes a central processing unit (CPU) to process information. The CPU 2 functions as figure recognizing means.

Figure 2:
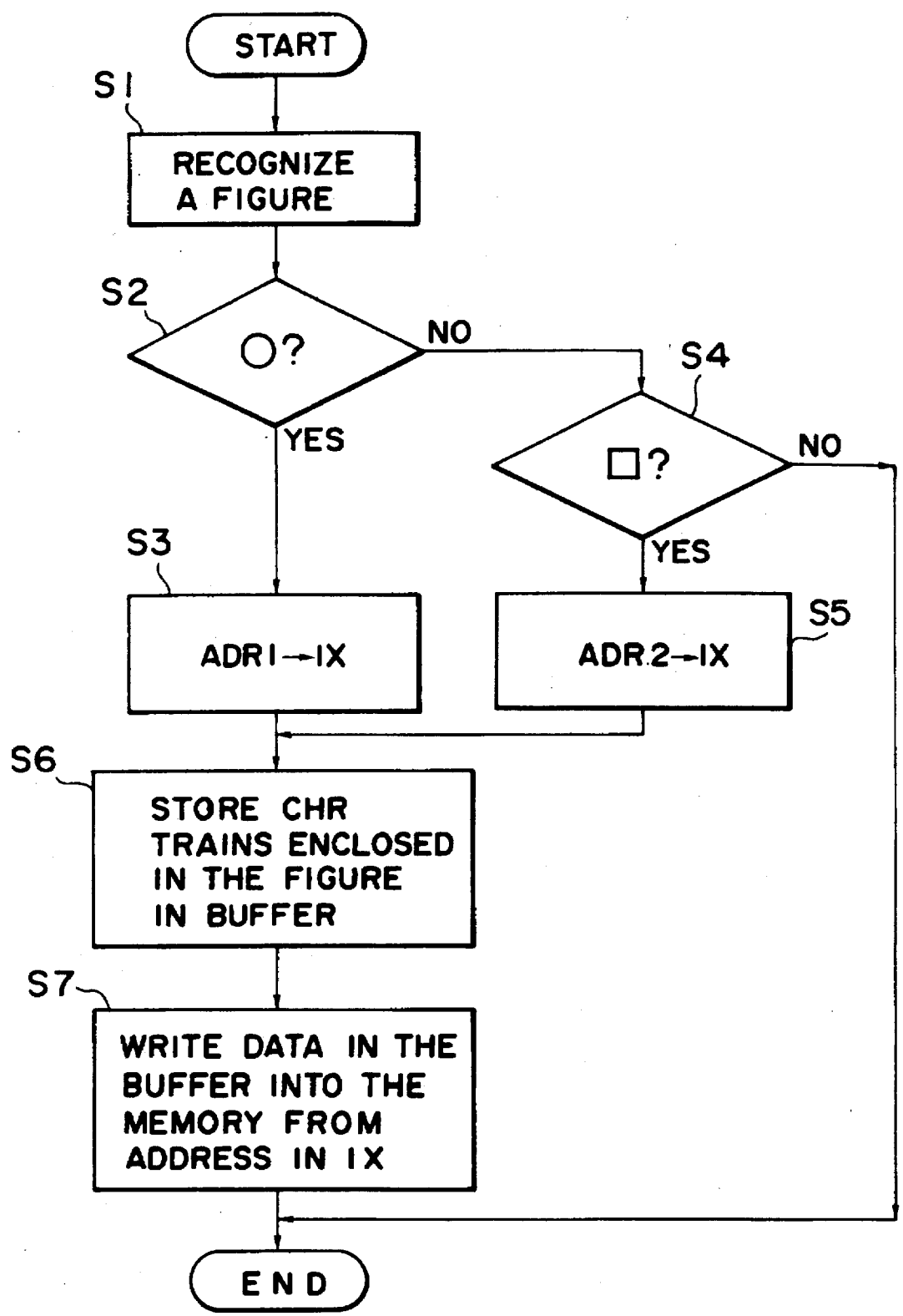
FIGS. 2 and 3 are flowcharts showing control procedures of a CPU 2.
Figure 3:
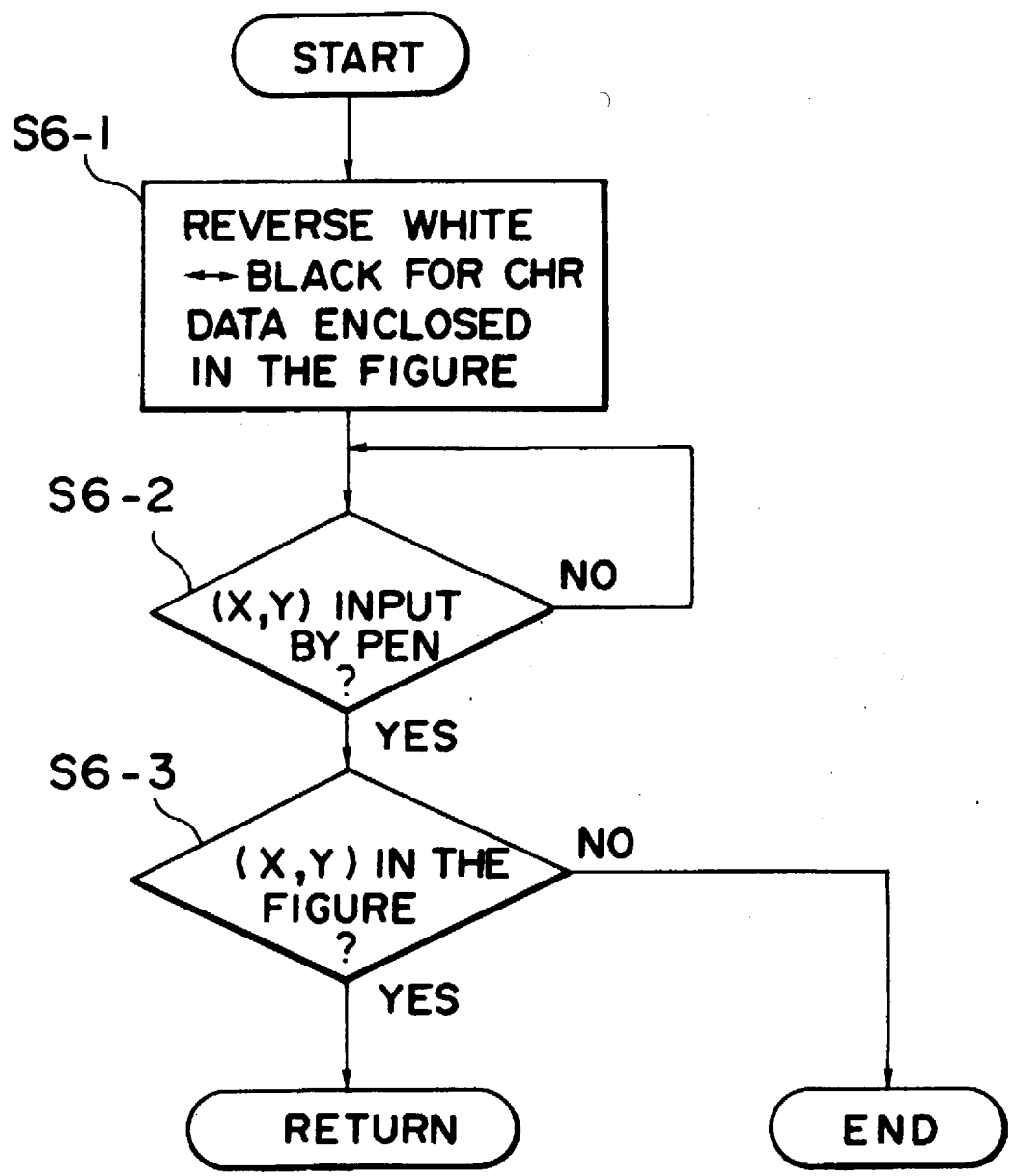

Reference numeral 2-1 denotes a read only memory (ROM) in which control procedures shown in FIGS. 2 and 3 are stored.

A buffer 2-2 temporarily stores input/output information.

A keyboard 3 is provided to input character data.

Reference numeral 4 denotes a liquid crystal display (LCD) consisting of, e.g., 256×128 dots. The LCD 4 has a video RAM (VRAM) 4-1 as first memory means for storing image information to display.

Reference numeral 5 denotes a transparent tablet as input means which can input position information of 256×128 dots. A designating pen 5-1 for input is attached to the tablet 5. To prevent the display of the LCD 4 from being obstructed, each dot of the display screen of the transparent tablet 5 is made correspond to a respective dot of the LCD 4.

The character data input from the keyboard 3 is stored into the memory area 1-3 in the RAM by the CPU 2. Further, the input character data is converted into image data (font data) by the CPU 2 and sent to the VRAM 4-1. The information stored in the VRAM 4-1 is displayed on the display screen of the LCD 4.

The CPU 2 performs input and output control so as to display on the LCD 4 not only the input information but also the information stored in the memory area 1-3. If position information is input from the transparent tablet 5 while the character data is displayed on the LCD 4, the CPU 2 executes the control procedures of FIGS. 2 and 3.

In the control procedure of FIG. 2, the CPU 2 recognizes a figure of the input position information from the position information input from the tablet 5 (step S1).

In this embodiment, when the input position information forms a circle, the memory area 1-1 is designated. When it forms a square shape, the memory area 1-2 is designated. The figure recognition can be performed by using a well-known control program such as a vector recognizing method or the like.

As the result of the figure recognition in step S1, if the input position information from the tablet 5 forms, e.g., a circular figure, in order to store the display information of the LCD 4 enclosed in this circle, the CPU 2 stores a head address $ADR_1$ in the font information memory area 1-1 into a register IX (steps S2 and S3).

When the CPU 2 decides that the input position information forms a square shape, the CPU 2 stores a head address $ADR_2$ in the code information memory area 1-2 into the processing register IX (steps S4 and S5).

Next, the display information enclosed in the input figure is stored into the buffer 2-2 in the CPU 2. At this time, to fetch the display information in the form of font information, the dot information included in the input figure is taken out of the VRAM 4-1 of the LCD 4 by the CPU 2. The extracted dot information is stored into the address which is designated by the register IX in the font information memory area 1-1 (step S7).

Similarly, to fetch the character data in a form of code information, the CPU 2 extracts only the character data included in the square figure from the input character code data stored in the memory area 1-3. The CPU 2 stores the extracted character data into the address in the code information memory area 1-2 designated by the register IX.

After that, the CPU 2 executes information processes such as synthesis of images, edition of documents, and the like on the basis of the character data and image data stored in the memory areas 1-1 and 1-2.

In this embodiment, the explanation has been made with respect to the example in which a square and circular figures are input from the transparent tablet 5. However, the invention is not limited to those figures. It is also possible to constitute the system such that other various kinds of figure patterns such as triangles, parallelograms, hook-shaped parenthesis, circular parenthesis, and the like are predetermined, the memory area is selected in accordance with the input figure pattern, the insertion, deletion, or the like of the display image can be easily designated, and information can be easily read out of the memory and displayed in the area enclosed in the figure on the display screen.

On the other hand, to input not only figure information but also character data or the like from the transparent tablet, in order to distinguish "0" of the alphabetic character from the circular figure, it is sufficient to preset a discriminating pattern by adding a point in the circular figure or the like.

A desired memory area which is designated by the user is not limited to the range enclosed in the input figure. For example, in the case of storing information on a word unit basis, a triangle is set. In the case of storing information on a sentence unit basis, a square is set. In this manner, a figure shape is determined in correspondence to a length of sentence. It is also possible to designate so as to store the relevant word, sentence, or the like into the memory at the central position of the figure. In this case, in the process in step S6 shown in FIG. 2, the input figure including the word is designated by the center of the input figure or the word information in the area designated is stored into the buffer 2-2.

An explanation will now be made with respect to the case where, when a range of information to be stored into the RAM 1 is designated from the transparent tablet 5, a check is made to see if the user could designate desired data or not.

FIG. 3 shows an example of a control procedure to check whether data has been designated or not.

It is sufficient that this control procedure is executed between the processes in steps S6 and S7 in the control procedure shown in FIG. 2.

In FIG. 3, when a figure is input from the transparent tablet 5, the CPU 2 performs the reversal of white and black of the character data included in the figure. This white/black reversal can be realized by inverting the value of each bit of the image information in the range included in the figure in the image information stored in the VRAM 4-1, namely, by rewriting from "1" to "0" and from "0" to "1" (step S6-1).

Next, when the operator inputs a confirmation by using the designating pen 5-1, the processing routine is returned to step S7 shown in FIG. 2, and if a key to correct the range is input, step S1 follows to newly designate the range again (steps S6-2 and S6-3). To input that the designated range falls within a desired range, an arbitrary position on the tablet 5 in the input figure is input by using the designating pen. In the case of reinput of the designating range, the position out of the input figure is input by using the pen 5-1.

Although the embodiment has been described with respect to the example in which the LCD is used as the display device, the invention can be also applied to a CRT display device using a cathode ray tube.

Further, in the case where the CRT display device has a character generator to convert character code data into font data, there is no need to perform the font information conversion by the CPU.

I claim:

1. An information processing system comprising:

display means having a display screen for displaying information as an image on said display screen;

coordinate input means having a position coordinates system corresponding to said display screen of said display means, for inputting a figure pattern;

recognizing means connected to said coordinate input means for recognizing the figure pattern input by said coordinate input means;

memory means for storing information; and information processing means, connected to said memory means, for reading an instruction corresponding to the figure pattern recognized by said recognizing means and for storing information corresponding to a desired portion of the image displayed on the display screen of said display means in response to said recognizing means recognizing the figure pattern to be of a specific type, the information being stored in a different one of plural memory areas depending on the recognized figure pattern.

2. A system according to claim 1, wherein said display means is a liquid crystal display device.

3. A system according to claim 1, further having input means for inputting information to be displayed by said display means.

4. A system according to claim 1, wherein said pattern input means comprises a coordinates input tablet.

5. A system according to claim 1, wherein said memory means stores the information corresponding to the displayed image and to a storage instruction.

6. A system according to claim 1, wherein said memory means stores the information displayed on the display screen at a position different from a position at which the information has been stored, in response to said recognizing means recognizing the figure pattern to be of a specific type.

7. A system according to claim 1, wherein said memory means stores the information displayed on the display screen at different positions in response to said recognizing means recognizing the figure patterns to be of specific types.

8. An information processing system comprising:

display means having a display screen for displaying information, as an image on said display screen;

coordinate input means having a position coordinates system corresponding to said display screen for inputting a figure pattern;

recognizing means connected to said coordinate input means for recognizing the figure pattern input from position coordinates of the figure pattern input by said coordinate input means;

reversal display control means connected to said display means for reversing and displaying a desired portion of the image displayed on the display screen of said display means corresponding to an area designated by the figure pattern recognized by said recognizing means; and instructing means connected to said display means for reading an instruction corresponding to the figure pattern recognized by said recognizing means and for instructing registration of the desired portion of the image reversed and displayed by said reversal display control means in response to said recognizing means recognizing the input figure pattern to be of a specific type, the desired portion of the image being stored in a different one of plural memory areas depending on the recognized figure pattern.

9. A system according to claim 8, wherein said display means is a liquid crystal display device.

10. A system according to claim 8, further having input means for inputting information to be displayed by said display means.

11. A system according to claim 8, wherein said pattern input means comprises a coordinates input tablet.

12. A system according to claim 8, further comprising means for storing information corresponding to the displayed image and to the registration instruction.

13. A system according to claim 12, wherein said memory means stores the information displayed on the display screen at a position different from a position at which the information has been stored, in response to said recognizing means recognizing the figure pattern to be of a specific type.

14. A system according to claim 12, wherein said memory means stores the information displayed on the display screen at different positions in response to said recognizing means recognizing the figure patterns to be of specific types.

15. An information processing system comprising:
display means having a display screen for displaying the information;
pattern input means having a coordinates system corresponding to said display screen of said display means, for inputting a figure pattern;
memory means for storing information; and
control means for recognizing a type of the input figure pattern and for, when said pattern input means inputs a plurality of such figure patterns, controlling said memory means to store desired portions of the information displayed on the display screen of said display means corresponding to areas designated by the input figure patterns in respective different memory areas depending on the recognized types of the input figure patterns.

16. A system according to claim 15, wherein said display means comprises a liquid crystal display device.

17. A system according to claim 15, further comprising input means for inputting the information to be stored in said memory means.

18. A system according to claim 15, further comprising instruction means for instructing said control means to store the information.

19. A system according to claim 15, wherein said pattern input means comprises a coordinates input tablet.

20. A system according to claim 15, wherein said memory means stores the information corresponding to the displayed information and to a storage instruction.

21. A system according to claim 15, wherein said memory means stores the information displayed on the display screen at a position different from a position at which the information has been stored, in response to said control means recognizing a specific type of the input figure pattern.

22. A system according to claim 15, wherein said memory means stores the information displayed on the display screen at different positions in response to said control means recognizing different types of the input figure pattern.

23. An information processing system comprising:
display means having a display screen for displaying information as an image on said display screen;
pattern input means having a position coordinates system corresponding to said display screen of said display means, for inputting a figure pattern;
recognizing means connected to said pattern input means for recognizing the figure pattern input by said pattern input means;
memory means for storing information; and information processing means, connected to said memory means, for storing a desired portion of the information corresponding to an image displayed on the display screen of said display means in said memory means designated by the figure pattern recognized by said recognizing means,
wherein, when said pattern input means inputs a plurality of such figure patterns, said information processing means stores desired portions of the information in respect different memory areas of said memory means depending on types of the input figure patterns.

24. A system according the claim 23, wherein said display means comprises a liquid crystal display device.

25. A system according to claim 23, further comprising input means for inputting the information to be displayed by said display means.

26. A system according to claim 23, wherein said pattern input means comprises a coordinates input tablet.

27. A system according to claim 23, wherein said memory means stores the information corresponding to the displayed image and to a storage instruction.

28. A system according to claim 23, wherein said memory means stores the information displayed on the display screen at a position different from a position at which the information has been stored, in response to said recognizing means recognizing the figure pattern.

29. A system according to claim 23, wherein said memory means stores the information displayed on the display screen at different positions in response to said recognizing means recognizing the figure patterns.

30. A storage medium for storing a computer readable program carried out in an information processing apparatus, with the program comprising the steps of:
inputting figure information;
generating an instruction for recognizing the input figure information and storing information displayed on a display screen onto a memory in response to a recognition result; and
storing information corresponding to the displayed information onto the memory in response to the generated instruction, the corresponding information being stored in a different one of plural memory areas depending on the recognized figure information.

31. A storage medium according to claim 30, wherein said storing step stores information corresponding to the displayed information onto the memory in response to the generated instruction.

32. A storage medium according to claim 30, wherein said storing step stores the displayed information at a position, of the memory, different from a position at which the information has been stored, in response to the generated instruction.

33. A storage medium according to claim 30, wherein said storing step stores the displayed information at different positions of the memory, in response to a plurality of types of the generated instructions.

34. An information processing method comprising the steps of:

displaying information stored in a memory on a display screen;

inputting figure information so as to store the displayed information into the memory; and instructing recognition of the input figure information and storage of the displayed information at a predetermined position of the memory in response to a recognition result.

35. A method according to claim 34, wherein said instructing step instructs storage of information corresponding to the displayed information.

36. A method according to claim 34, wherein said instructing step instructs storage of the displayed information at a position, of the memory, different from a position at which the information has been stored, in response to the recognition result.

37. A method according to claim 34, wherein said instructing step instructs storage of the displayed information at different positions of the memory, in response to a plurality of recognition results.

* * * * *

UNITED STATES PATENT AND TRADEMARK OFFICE
CERTIFICATE OF CORRECTION

PATENT NO. : 5,680,527
DATED : Oct. 21, 1997
INVENTOR(S) : SAKAGUCHI

It is certified that error appears in the above-identified patent and that said Letters Patent is hereby corrected as shown below:

ON THE TITLE PAGE:
At [57] Abstract

Line 14, "An an" should read --An--.

Column 1

Line 56, "device and," should read --device, and--.

Column 2

Line 2, "EMBODIMENTS" should read --EMBODIMENT--; and
Line 34, "made" should read --made to--.

Column 6

Line 12, "and information" should read: --and ¶ information--.

Line 22, "respect" should read --respective--.

Signed and Sealed this

Seventh Day of July, 1998

Attest:

BRUCE LEHMAN

Attesting Officer

Commissioner of Patents and Trademarks